United States Patent [19]

Carlsson

[11] 3,971,486

[45] July 27, 1976

[54] APPARATUS FOR HANDLING AND TRANSPORTING CONTAINERS, LOAD SUPPORTING BODIES, PALLETS AND THE LIKE

[75] Inventor: Ingemar Carlsson, Lindesberg, Sweden

[73] Assignee: Lihnell Vagn AB, Braas, Sweden

[22] Filed: Mar. 13, 1974

[21] Appl. No.: 450,918

[30] Foreign Application Priority Data
Mar. 16, 1973 Sweden................................ 7303700

[52] U.S. Cl................................. 214/505; 214/515
[51] Int. Cl.² ............................................ B60P 1/28
[58] Field of Search ........... 214/501, 505, 512, 515, 214/516, 77 R, 352, DIG. 12

[56] References Cited
UNITED STATES PATENTS

| | | | |
|---|---|---|---|
| 2,724,522 | 11/1955 | Phebus | 214/77 R |
| 2,867,341 | 1/1959 | Tieslau | 214/515 X |
| 2,910,203 | 10/1959 | Todd | 214/DIG. 12 |
| 3,450,281 | 6/1969 | Groberg | 214/352 |
| 3,522,894 | 8/1970 | Tornheim | 214/77 R X |
| 3,716,157 | 2/1973 | Mittler et al. | 214/505 |

*Primary Examiner*—Albert J. Makay
*Attorney, Agent, or Firm*—Beveridge, DeGrandi, Kline & Lunsford

[57] ABSTRACT

An apparatus for handling, loading, unloading and transporting containers, load supporting bodies, pallets and like bulky and heavy objects with the use of a transport vehicle and a fork lift type lifting device disposed on the transport vehicle. The fork lift device is pivoted to one end of the transport vehicle in such a way that the frame carrying the fork lift device can be pivoted between a vertical position and a position coplanar with the chassis of the transport vehicle. Coupling means associated with the fork lift device is designed so as to permit being coupled with mating coupling means associated with the end of a load supporting body which is usable as a transportation support for containers and like objects. When the load supporting body is coupled with the fork lift device, the body can be pulled onto and lowered from the transport vehicle under simultaneous pivotment of the frame of the fork lift device and shifting of the fork lift device along the frame thereof.

5 Claims, 5 Drawing Figures

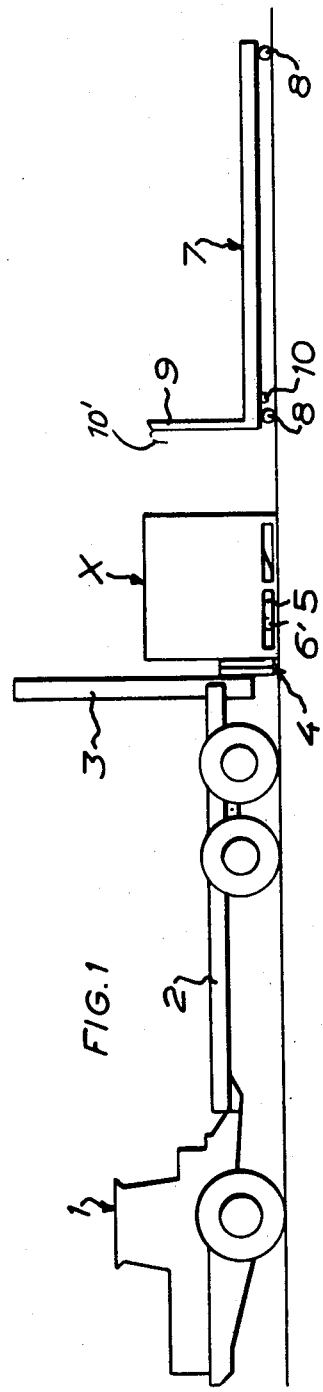
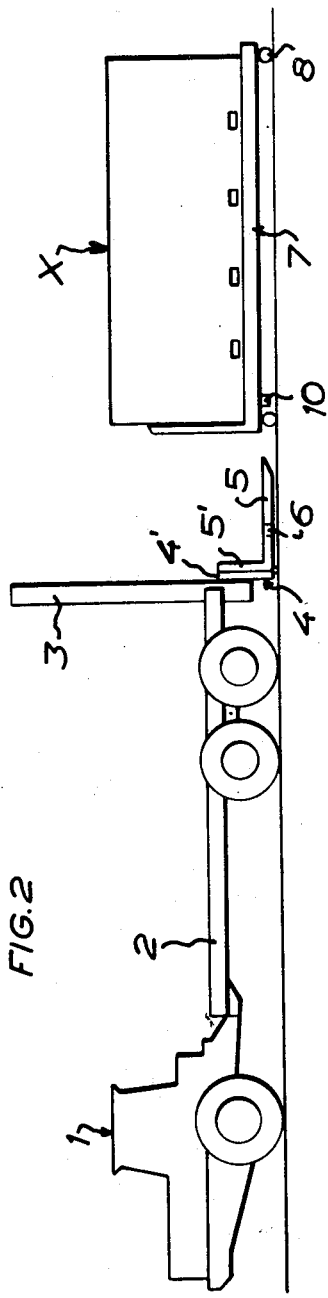

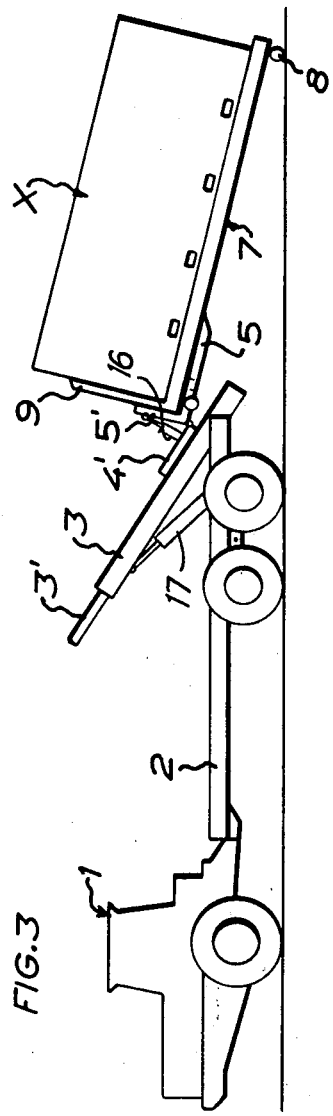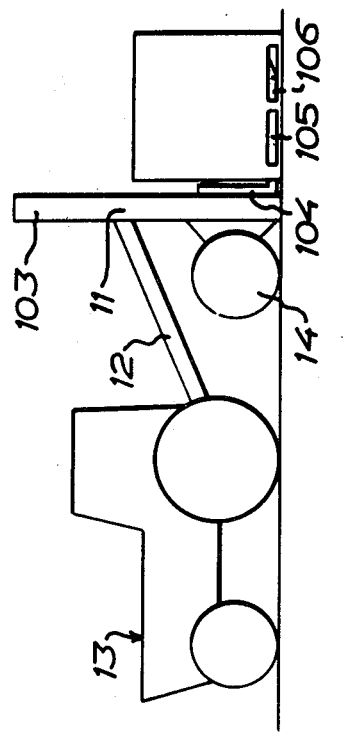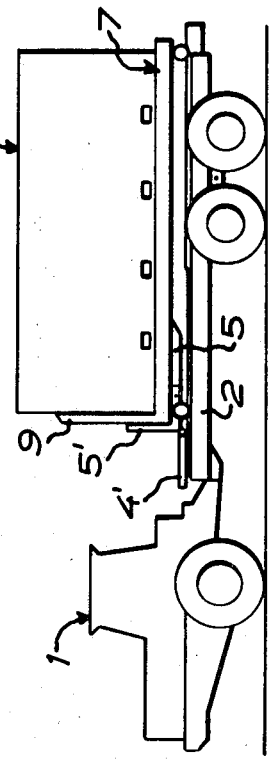

APPARATUS FOR HANDLING AND TRANSPORTING CONTAINERS, LOAD SUPPORTING BODIES, PALLETS AND THE LIKE

This invention relates to an apparatus for handling, loading, unloading and transporting containers, load supporting bodies, pallets and like bulky and heavy means.

Containers and detachable load supporting bodies with or without walls are utilised to an ever increasing extent because of the advantages gained by unit-loading. A problem associated with the handling and transporting of containers and detachable load supporting bodies is that strong lifting appliances must be available to permit transferring the containers between for instance railway cars, trucks or like transport vehicles.

The present invention has for its object to provide an apparatus which permits the loading and unloading of containers and like heavy objects, wherever this is desired, and also the transportation of such containers and objects.

According to the invention, the apparatus comprises a per se known fork lift device mounted to a frame at the rear end of a transport vehicle, and a preferably wheeled load supporting body, the frame being pivotally mounted in relation to the chassis of the transport vehicle, mating coupling means being provided at the fork lift device and the load supporting body, respectively, the fork lift device being adapted, when used in the conventional manner, to permit transferring containers from an optional support onto and from the load supporting body and also, after coupling of the mating coupling means of said fork lift device and said body, loading and unloading said body onto and from the transport vehicle under simultaneous shifting of the fork lift device along the frame thereof and pivotment of said frame.

The invention is also concerned with a method of handling, loading, unloading and transporting containers, detachable load supporting bodies, pallets and like bulky and heavy objects with the use of a transport vehicle and a fork lift type lifting device thereon. This method comprises the steps of arranging a frame carrying the fork lift device and serving as a guide therefor at the end of the chassis of the transport vehicle in such a way that the frame can be pivoted between a substantially vertical position and a substantially horizontal position in which said frame rests on the vehicle chassis, providing the fork lift device with one or more coupling means, providing a detachable preferably wheeled load supporting body with one or more mating coupling means at least at one end thereof, conventionally utilising the fork lift device for transferring containers from and to an optional support and to and from the detachable load supporting body, engaging the coupling means of the fork lift device with the mating coupling means of the load supporting body for lifting said body onto the transport vehicle, and lifting said body and pulling it onto the chassis of the transport vehicle under simultaneous shifting of the fork lift device along the frame carrying said fork lift device and lowering of said frame onto the vehicle chassis.

Embodiments of the apparatus according to the invention will be more fully described hereinbelow and with reference to the accompanying drawings in which:

FIGS. 1 to 4 illustrate a transport vehicle equipped with said apparatus during various phases of a loading operation;

FIG. 5 illustrates a modified embodiment of said apparatus mounted to a tractor-semitrailer combination.

The transport vehicle 1 in the embodiment illustrated is an articulated tractor-semitrailer combination, but the vehicle can also be a truck or other self-propelled or drawn vehicle.

A per se known frame 3 for a fork lift device 4 is pivotally mounted at the rear end of the chassis 2 of the vehicle 1. The hydraulically or mechanically operated fork lift device may be of substantially conventional construction. In the embodiment shown, the fork lift device comprises a yoke 4' movable along the frame 3 which is provided with an extension member 3'. A plate 5' carrying the lifting forks 5 is pivoted to said yoke by pivot means at the lower end of the plate 5'. The yoke 4' is actuated by means of a jack assembly (16), and a further jack assembly (17) is connected between the yoke 4' and the plate 5'. Coupling means 6 in the form of suitably shaped recesses, projections or the like, are arranged at the forks 5.

A load supporting body with which the described mechanism is adapted to co-operate, is designated 7. In the embodiment illustrated, the body 7 is equipped with wheels 8 and a front end wall 9. Coupling means 10 in the form of suitably shaped projections, recesses or the like are arranged at said body 7. The coupling means 10 of said body 7 are adapted to engage in the mating coupling means 6 of the lift forks 5.

The apparatus functions as follows:

FIG. 1 shows how the vehicle 1 has been backed up to a container X and how the forks have been inserted beneath it. The container is then placed on the load supporting body 7.

FIG. 2 shows how the vehicle has been driven up to the front end wall 9 of the load supporting body 7 so that the mating coupling means 6 and 10 can engage in each other, after the lift forks have been inserted beneath said body.

FIG. 3 shows how the front end of the load supporting body 7 is pulled onto the vehicle chassis 2 under simultaneous shifting of the fork lift device 4, 5 along the frame 3, lowering of said frame 3 onto the vehicle chassis 2 and outward pivotment of the plate 5' from the yoke 4'. It should be mentioned that the coupling means are capable of mutual pivotment about an axis at right angles to the load supporting body 7 and about a horizontal axis, while retaining their relative engagement.

FIG. 4 shows the position of the load supporting body 7 with the container X thereon, after loading has been concluded.

Unloading is effected in the reverse order.

In the embodiment illustrated in FIG. 5, which is employed in fundamentally the same manner as that illustrated in FIGS. 1–4, the frame 103 is included as rear part in the subframe 12, pivoted at 11, of a semitrailer which is supported at its front end by a tractor 13. FIG. 5 shows how a container X rests on the forks 105 of the fork lift device 104 so that the container can be placed on a body similar to the load supporting body 7. The forks 105 are equipped with coupling means 106 so that, by using the forks, the body can be lifted and pulled onto the support formed by the frame 103 and the subframe 12. The difference between the earlier embodiment and that of FIG. 5 resides in that the wheels 14 supporting the load carrying section of the transport vehicle are connected with the frame 103 of the fork lift device 104, and not, as before, with the vehicle chassis. The construction illustrated in FIG. 5 is suited for one-axle semitrailers and brings the advantage that the wheels can be more or less completely relieved of load while lifting is effected by means of the forks 105.

In the embodiment illustrated in FIG. 5 the coupling means 106 are disposed at the outer ends of the forks which are nonrotatably connected with the yoke of the fork lift device. As indicated by dotted lines in FIG. 1, the coupling means 10' of the load supporting body shall in such a case be disposed at the upper part of the body front end wall at a distance from the bottom thereof, which substantially corresponds to the fork length.

The design of the mating coupling means of the fork lift device and the load supporting body can be varied. In the embodiments illustrated, the coupling means are placed at the forks themselves. However, nothing prevents the coupling means from being placed directly on, for example, the plate 5' in the embodiment illustrated in FIGS. 1–4, while the corresponding coupling means of the load supporting body are placed at the front end of said body.

While the invention has been described and shown in some preferred embodiments, it is readily understood that modifications can be resorted to within the spirit and scope of the appended claims.

What I claim and desire to secure by Letters Patent is:

1. An apparatus for handling, loading, unloading and transferring heavy articles comprising a transport vehicle, an elongated frame pivotally mounted on the rear end of said vehicle for movement about a first horizontal axis extending transversely of said vehicle, means moving said frame about a first horizontal axis between a substantially horizontal position and a generally vertical position, a fork lift device, mounting means supporting said fork lift device on said frame for movement theralong, pivot means mounting said fork lift device to said mounting means for pivotal movement about a second horizontal axis extending generally parallel to said first hoizontal axis, means pivotally moving said fork lift device about said second axis, whereby said frame and said fork lift may be pivoted about their respective axes simultaneously, a load supporting body, and cooperating coupling means on said fork lift device and said supporting body whereby, upon engagement of said cooperating coupling means, said body may be loaded onto said vehicle by simultaneous movement of said frame about said first axis and of said fork lift device along said frame and about said second axis, said apparatus also being operable as a conventional fork lift.

2. An appartus as claimed in claim 1 wherein the frame with the fork lift device is pivotally mounted at the rear end of a substantially rigid chassis of said transport vehicle.

3. An apparatus as claimed in claim 1 wherein the frame is a pivotally mounted part of the subframe of a one-axle semitrailer, and the wheels of the semitrailer are mounted to said part formed by the frame.

4. The apparatus as defined in claim 1 wherein said load supporting body comprises a wheeled platform having a load bearing surface adapted to support heavy articles.

5. The apparatus according to claim 1 wherein said cooperating coupling means includes means permitting limited pivotal movement between said load supporting body and said fork lift device as said load supporting body is being loaded onto said vehicle.

* * * * *